W. S. HADAWAY, Jr.
RECIPROCATING HEATER.
APPLICATION FILED MAR. 11, 1913.
1,094,714.
Patented Apr. 28, 1914.
2 SHEETS—SHEET 1.
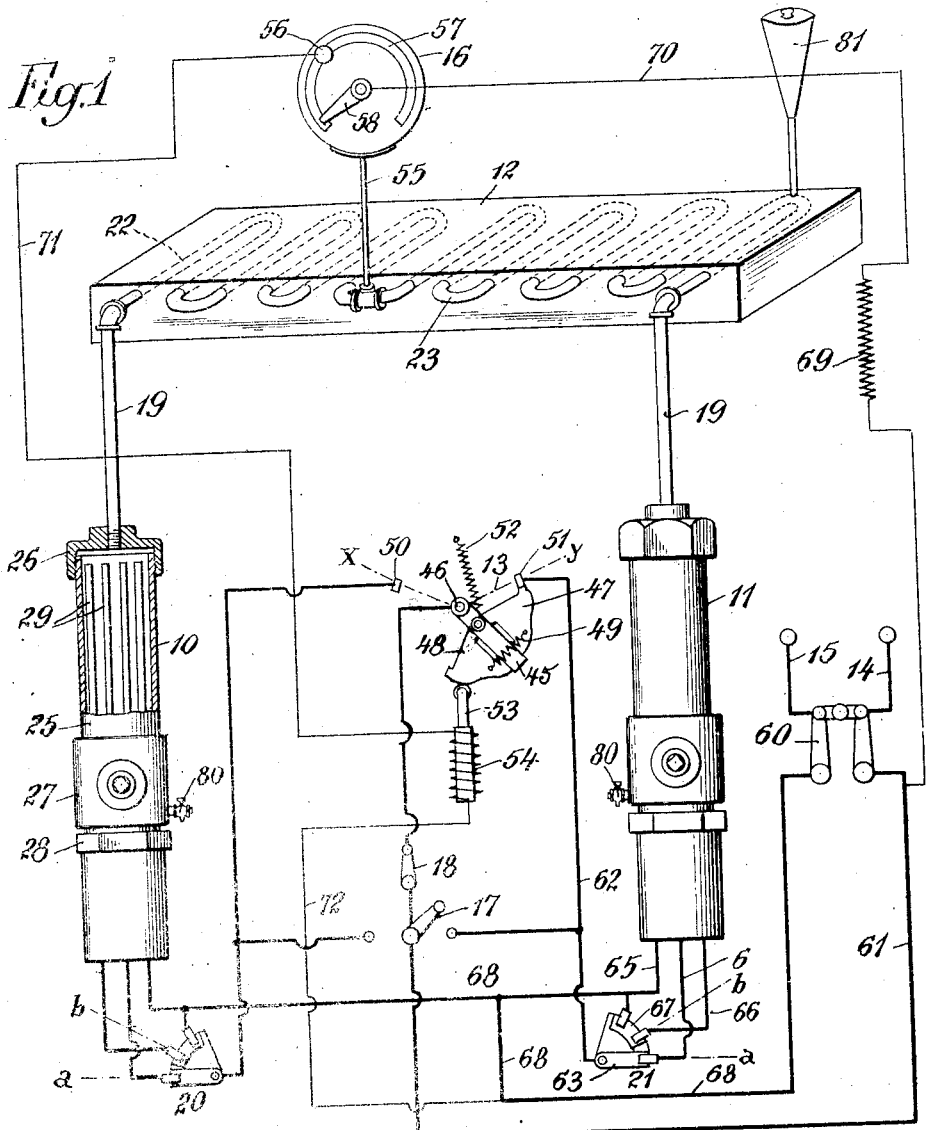
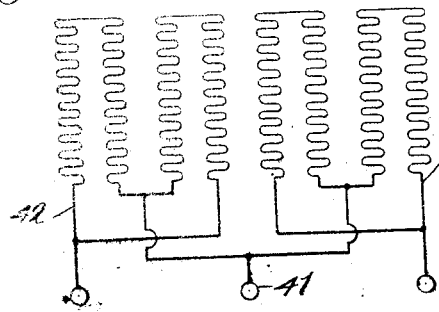
WITNESSES
F. Graves
G. R. Quimby
INVENTOR
William S. Hadaway Jr.
BY
[signature]
ATTORNEY

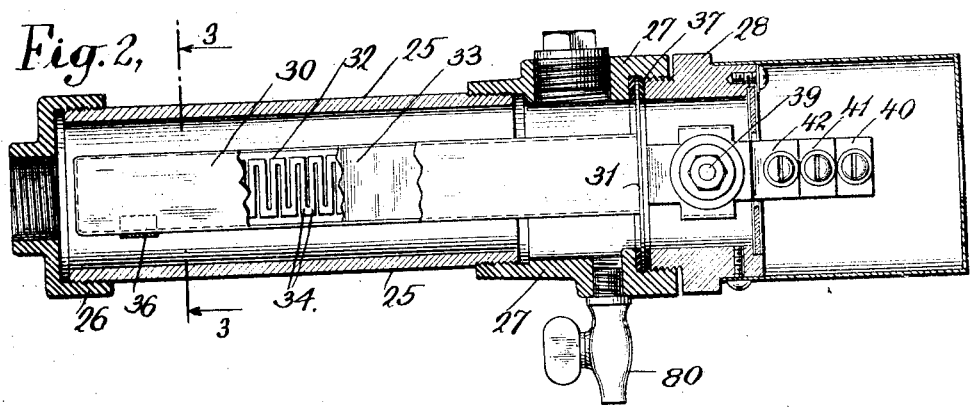
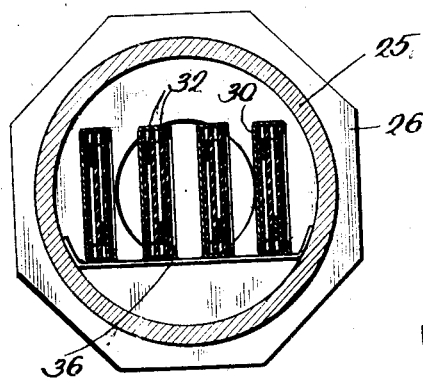

UNITED STATES PATENT OFFICE.

WILLIAM S. HADAWAY, JR., OF NEW ROCHELLE, NEW YORK.

RECIPROCATING HEATER.

1,094,714.  Specification of Letters Patent.  Patented Apr. 28, 1914.

Application filed March 11, 1913. Serial No. 753,504.

*To all whom it may concern:*

Be it known that I, WILLIAM S. HADAWAY, Jr., a citizen of the United States, and a resident of New Rochelle, in the county of Westchester and State of New York, have invented certain new and useful Improvements in Reciprocating Heaters, of which the following is a specification, reference being had to the accompanying drawings, forming a part thereof.

My invention relates to heaters and particularly to such as embody electrically heated steam generators.

One object of my invention is to provide a simple and reliable heater of the aforesaid character that shall insure and maintain an adequate fluid drainage in a heated body even if the fluid passages are small and tortuous and the shape and size of the body such as to render gravity drainage imperfect or impossible.

Other objects will be set forth hereinafter.

I will describe my invention in the following specification and point out the novel features thereof in appended claims.

Referring to the drawings: Figure 1 is a partially diagrammatic view of a heater arranged and constructed in accordance with my invention. Fig. 2 is a longitudinal section of one of the steam generators of Fig. 1. Fig. 3 is an enlarged transverse section on the line 3—3 of Fig. 2. The electric heater units which form parts of the steam generator are shown in Fig. 4 apart from the water chamber. Fig. 5 is a simple diagram showing the circuit connections between the heater units.

Like characters of reference designate corresponding parts in all the figures.

For convenience, I have illustrated the heated body, or working member to which heat is supplied, as a steam table or similar device, but the working member *per se* does not form a part of my invention and will be adapted to the class of service for which the heater is intended.

A pair of steam generators 10 and 11 are connected by suitable piping to a heated body, such for example as a steam table 12, which establishes a communication between them. Each of the steam generators is electrically heated and a switch 13 is adapted to connect either the one or the other to a suitable source of electric energy indicated by line conductors 14 and 15.

The operation of the switch 13 is automatic and is dependent upon the fluid pressure and temperature of the steam table as indicated by a pressure gage 16. A manually operated switch 17 may however be utilized for performing the same function independently of the pressure gage provided a switch 18 is first opened to render the automatic switch inoperative.

The amount of electric energy translated into heat in the generators may be adjusted by heat control switches 20 and 21.

The elements of which the heater is comprised will now be considered more in detail although my present invention is not concerned with the specific details of any one of them.

The steam table 12 comprises a relatively large square or rectangular body which lies in a horizontal plane and is provided with a long steam passage 22. This passage may be produced by providing suitable openings in the body itself or a tube or pipe 23 may be cast or otherwise built into the body as shown in the drawings. In fact any well known arrangement for distributing the steam throughout the body adjacent to its working surface may be employed. The respective ends of the tube 23 are connected to the steam generators 10 and 11 by pipes 19. These generators are similar to each other and each of them comprises a cylinder or barrel 25 having a cap 26, which is preferably in the form of a pipe reducer and is adapted to receive one of the connecting pipes 19, an annular box 27 a collar or nut 28, and an electric heater composed of a plurality of units 29.

The heater units comprise flattened metal tubes or casings 30 which are closed at one end and are sealed into a common header 31 at the other. Furthermore each unit comprises a resistance ribbon 32 which is insulated by mica strips 33 or other suitable insulation and is disposed in the flattened tube or casing. The resistance ribbon is preferably provided with transverse slots 34 which are cut alternately from opposite edges of the ribbon to provide a zig-zag path for the electric current. Both terminals of the resistance ribbon are brought out of the open end of the flattened tube which extends beyond the header 31, the ribbon being bent back on itself and the parts separated by insulation in a well known manner. (See Fig. 3.)

The several heater units are secured to a spacing strip 36 near one end of the cylinder or barrel 25 and their relative position is maintained at the opposite end by the header 31 which, together with a gasket 37 is securely held in position between the annular body 27 and the collar or nut 28. The terminals of the resistance ribbons are brought out as shown in Fig. 4 and are perforated to receive an insulated stud 39 which extends through them. Terminal members 40, 41, 42 are also mounted on the insulated stud and electrical connections are established and maintained between the terminals of the ribbon and the terminals of the heater by means of suitable conducting strips and insulating washers. The circuit connections established are clearly shown in the diagram of Fig. 5.

Each of the switches 20 and 21 is adapted to occupy a position $a$ in which the terminals 40 and 42 are connected to each other and to one circuit conductor and the terminal 41 to the circuit conductor of opposite polarity, and a position $b$ in which the terminals 40 and 42 are respectively connected to the circuit conductors.

The switch 13 is intended to represent any suitable form of change-over switch and is adapted to occupy a position $x$ and a position $y$. It comprises a contact bearing member 45 which is pivoted at 46 and a pair of switch blades 47 and 48 which are pivotally connected to the member 45 and are resiliently connected to each other by a spring 49. When the switch occupies the position $x$ the blade 48 engages a contact 50 and when it occupies the position $y$ the blade 47 engages the contact 51. A spring 52 tends to throw the switch into the position toward which it is moved, as soon as it has passed through its intermediate central position, in a well known manner.

The switch is actuated by an electro-magnet 53 having a coil 54.

The pressure gage 16 may be of any suitable construction and is connected by a pipe 55 to an intermediate point in the pipe 23. The gage is provided with a relatively stationary contact member 56 which is adjustably secured to a ring 57, and a movable contact member 58 which is adjusted in accordance with variations in pressure in the steam table.

The fluid chambers of the generators and the pipes of the heater are preferably kept nearly full of water, although the operation is the same so long as any water remains in contact with the steam during the operation of the device. The heater may be filled by opening taps 80, with which the generator bodies 27 are provided and supplying water to a funnel 81. The taps are closed when the air is excluded and the pipes full. A small body of air is always pocketed in the pressure gage and its connecting pipe so that the pressure gage indications follow the laws governing saturated steam and are not dependent upon the direct liquid expansion of the water when heat is applied.

The operation of the pressure gage is similar to that embodied in my co-pending application Serial Number 749,595 filed February 20th, 1913.

The operation of the heater is as follows: Assuming that the switch 17 is open, that the switches 20 and 21 occupy their positions $a$ and that the switch 13 occupies its position $y$; if a line switch 60 is closed, electric energy is supplied from the line conductor 14 through one blade of the switch 60, a conductor 61, a blade 47 of switch 13 which engages contact 51, conductor 62, a contact 63 of switch 21, a conductor 64, through the several heater units of the steam generator 11 in multiple circuit, conductors 65 and 66, which are joined by a contact 67 of switch 21, a conductor 68 and the opposite blade of the switch 60 to line conductor 15. The electric energy thus supplied to the steam generator 11 partially vaporizes the water in the heater and fills the passages 22 of the steam table with saturated steam. The temperature and pressure existing in the steam passage gradually increases with the continued supply of electric energy to the generator until a predetermined pressure and temperature are reached at which the movable contact member 58 of the pressure gage 16 engages the adjustable contact 56. The maximum temperature of the steam table may be determined by suitably adjusting the position of the contact 56. When the gage contacts are in engagement, a control circuit is established from conductor 61 through a resistance 69, a conductor 70, the contacts 58 and 56, a conductor 71, the coil 54 of the magnet 53 and a conductor 72 to the conductor 68. The coil 54 is thus energized and the magnet so actuates the movable member of the switch 13 as to throw it into its position $x$. In this position the circuits previously traced through the heating units of the steam generator 11 are interrupted and corresponding circuits are completed through the heater units of the steam generator 10. The steam generator 10 which acted as a receiver during the time when the generator 11 was active is now supplied with electric energy, the functions of the generators being reversed. When the change-over is effected the pressure in the steam table is sufficiently reduced to cause the immediate separation of the contacts 56 and 58 and the interruption of the control circuits which are completed through them. The temperature of the steam table is however only slightly reduced. Nevertheless the generator 10 will continue to act as such for a material length of time before the change-over switch is again actuated. By the use of the two steam generators arranged as above indicated, I secure a substantially perfect drainage of the steam table although it may be relatively large and comprise a long tortuous steam passage which lies in a substantially horizontal plane. At the same time I avoid the necessity for a separate receiver and for a pump such as is ordinarily necessary for returning the condensed water from the receiver to the generator.

While I have described an automatic system, my invention is not limited in this respect and the heater may be manually controlled by merely opening a switch 18 and throwing the switch 17 into one of its positions $x'$ and $y'$ which correspond to positions $x$ and $y$ of the switch 13, the same circuit connections being established by the two switches.

The amount of electric energy translated into heat in either or both of the generators may be adjusted by changing the positions of one or both of the switches 20 and 21 and thereby connecting the heater units in a series-multiple relation instead of in a multiple relation.

The generators 10 and 11 may be independent, identical structures or they may be dissimilar and of unequal capacity. They need not be independent structurally but may be combined in a single structure and in fact various modifications may be effected without materially modifying the operation of the device and without departing from the spirit and scope of my invention. Furthermore my invention is evidently not limited to two generators or receptacles as more than two suitably connected may form parts of the same system or apparatus.

What I claim is:

1. A fluid heater comprising a plurality of receptacles, interposed heat radiating means communicating with the receptacles and means for alternately supplying heat to the receptacles.

2. A fluid heater comprising a plurality of receptacles, interposed heat radiating means communicating with the receptacles and establishing a communication between them and means for alternately supplying heat to said receptacles.

3. A heater comprising a plurality of steam generators, an interposed radiator, electric heaters for the generators and automatic means for alternately supplying energy to the heaters.

4. A heater comprising a plurality of steam generators, an interposed radiator, electric heaters for the generators and automatic means dependent upon the fluid pressure in the radiator for alternately supplying energy to the heaters.

5. An electric heater comprising a plurality of electrically heated steam generators, a steam heated body interposed between the generators and establishing a communication between them and automatic means for alternately supplying electric energy to the steam generators.

6. An electric heater comprising a plurality of electrically heated steam generators, a steam heated body interposed between the generators and establishing communication between them and automatic means dependent upon the pressure in the steam heated body for deënergizing one of the generators and energizing another.

7. A heater comprising a steam heated body, a pair of steam generators connected thereto, electric heaters for the generators, means for selectively supplying energy to the two heaters and means dependent upon the pressure in the steam heated body for actuating the selective means.

8. A steam heated body, a pair of steam generators interconnected therethrough, electric heaters for the generators, a source of electric energy, a switch for connecting one or the other of the heaters to said source and means for successively actuating the switch to alternately energize the heaters.

9. A steam heated body, a pair of steam generators interconnected therethrough, electric heaters for the generators, a source of electric energy, a switch for connecting one or the other of the heaters to said source and means dependent upon the pressure in the steam heated body for successively actuating the switch to alternately supply electric energy to the heaters.

10. An electric heater comprising a plurality of electrically heated steam generators, an interposed heat radiating means and automatic means for alternately supplying electric energy to the steam generators.

11. Heating apparatus comprising a heat radiator having an opening for heated fluid, a plurality of generating means for supplying heated fluid to said radiator, and automatic means dependent upon predetermined conditions in the radiator for rendering said generating means active in rotation.

12. Heating apparatus comprising a heat radiator, means for supplying heated vapor thereto, means for receiving vapor from said radiator, and means for causing the generating and receiving means to be interchanged in function.

13. Heating apparatus comprising a heat radiator having a passage for heated vapor, a plurality of generating means interconnected by said passage, and means for causing the vapor to flow in the radiator passage alternately in opposite directions.

14. A fluid heater comprising a plurality of vapor generating means, a radiator adapted to be supplied alternately with heated vapor from said generating means, whereby the direction of vapor flow through the radiator is periodically reversed.

15. Heating apparatus comprising a heat radiator having a passage for heated vapor, a plurality of generating means interconnected by said passage, and means dependent upon the temperature of said radiator for causing the vapor to flow in the radiator passage alternately in opposite directions.

In witness whereof, I have hereunto set my hand this 4th day of March, 1913.

WILLIAM S. HADAWAY, Jr.

Witnesses:
R. J. DEARBORN,
F. GRAVES.